United States Patent
Gorny

(10) Patent No.: US 12,340,177 B2
(45) Date of Patent: *Jun. 24, 2025

(54) SYSTEM AND METHOD FOR MONITORING A SENTIMENT SCORE

(71) Applicant: Nextiva, Inc., Scottsdale, AZ (US)

(72) Inventor: Tomas Gorny, Scottsdale, AZ (US)

(73) Assignee: Nextiva, Inc., Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,150

(22) Filed: Apr. 22, 2024

(65) Prior Publication Data

US 2024/0273304 A1 Aug. 15, 2024

Related U.S. Application Data

(63) Continuation of application No. 18/094,598, filed on Jan. 9, 2023, now Pat. No. 11,977,846, which is a (Continued)

(51) Int. Cl.
*G06F 16/30* (2019.01)
*G06F 17/18* (2006.01)
(Continued)

(52) U.S. Cl.
CPC .............. *G06F 40/30* (2020.01); *G06F 17/18* (2013.01); *G06Q 30/01* (2013.01); *G06Q 30/02* (2013.01); *G06Q 50/00* (2013.01); *H04L 51/212* (2022.05)

(58) Field of Classification Search
CPC ......... G06Q 30/02; G06F 16/18; G06F 16/30; G06F 16/248; G06F 3/0481; (Continued)

(56) References Cited

U.S. PATENT DOCUMENTS

| 6,654,738 B2 | 11/2003 | Nishioka et al. |
| 8,478,826 B2 | 7/2013 | Erhart et al. |

(Continued)

FOREIGN PATENT DOCUMENTS

WO 2011151817 12/2011

OTHER PUBLICATIONS

Oracleï£ CRM Application Foundation User Guide Release 11i Aug. 2002 Part No. A97632-01 (Year: 2002).*

(Continued)

*Primary Examiner* — Kuen S Lu
(74) *Attorney, Agent, or Firm* — Spencer Fane LLP; Steven J. Laureanti

(57) ABSTRACT

A system and method are disclosed for scoring sentiments of communication activity and includes one or more databases that stores data describing electronic communication between one or more customer devices and one or more service center devices and a computer. The computer is configured to monitor communication activity of the one or more customer devices and the one or more service center devices to determine whether a communication channel has been opened between the one or more customer devices and the one or more service center devices and identify one or more communication activities associated with the electronic communications. The computer is further configured to compare the identified one or more communication activities with one or more predetermined communication data, determine a sentiment score based on one or more correlations between the identified one or more communication activities and the communication data.

20 Claims, 3 Drawing Sheets

Related U.S. Application Data continuation of application No. 16/874,354, filed on May 14, 2020, now Pat. No. 11,551,009, which is a continuation of application No. 15/615,534, filed on Jun. 6, 2017, now Pat. No. 10,664,661, which is a continuation-in-part of application No. 14/485,626, filed on Sep. 12, 2014, now Pat. No. 9,710,814.

(51) Int. Cl.
*G06F 40/30* (2020.01)
*G06Q 30/01* (2023.01)
*G06Q 30/02* (2023.01)
*G06Q 50/00* (2024.01)
*H04L 51/212* (2022.01)

(58) Field of Classification Search
CPC .. G06F 3/04845; G06F 17/2785; G06F 17/18; G06F 17/30; G06F 17/30731; H04L 51/12; H04M 3/5133
USPC .......................................................... 707/748
See application file for complete search history.

(56) References Cited

U.S. PATENT DOCUMENTS

| | | | | |
|---|---|---|---|---|
| 8,515,739 | B2* | 8/2013 | Godbole | G06F 40/35 707/706 |
| 8,903,050 | B2 | 12/2014 | Beattie, Jr. et al. | |
| 8,909,771 | B2 | 12/2014 | Heath | |
| 9,106,749 | B2 | 8/2015 | Schultz et al. | |
| 9,134,215 | B1* | 9/2015 | Vignisson | G06N 5/04 |
| 9,460,083 | B2 | 10/2016 | Fink et al. | |
| 9,646,604 | B2 | 5/2017 | Erhart et al. | |
| 10,467,560 | B2 | 11/2019 | Aggarwal et al. | |
| 2008/0071687 | A1 | 3/2008 | Hengal | |
| 2009/0265307 | A1* | 10/2009 | Reisman | G06F 16/345 |
| 2009/0300632 | A1 | 12/2009 | Falcon et al. | |
| 2012/0011208 | A1* | 1/2012 | Erhart | G06Q 50/01 709/206 |
| 2012/0046985 | A1* | 2/2012 | Richter | G06Q 10/103 705/7.17 |
| 2013/0073336 | A1* | 3/2013 | Heath | G06Q 30/02 705/7.29 |
| 2013/0080928 | A1* | 3/2013 | Zhuang | H04L 12/1822 715/758 |
| 2013/0124257 | A1 | 5/2013 | Schubert | |
| 2013/0263231 | A1* | 10/2013 | Lautenschlager | H04L 63/08 726/4 |
| 2014/0161236 | A1* | 6/2014 | Beattie, Jr. | H04M 3/28 379/1.01 |
| 2014/0188459 | A1* | 7/2014 | Fink | G06F 40/30 704/9 |
| 2014/0236749 | A1 | 8/2014 | Yang | |

OTHER PUBLICATIONS

Oraclei535 CRM Application Foundation User Guide Release 11i Aug. 2002 Part No. A97632-01 (Year: 2002).*

European Examination Report for EP Invention Patent Application No. 20 205 396.3; Mar. 22, 2024; 7 Pages.

Anynymous: "System administrator—Wikipedia", Jul. 29, 2014 (Jul. 29, 2014), XP055443077. Retrieved from the Internet: URL:https://en.wikipedia.org/w/index.php?title=System_administrator&oldid=618999597 [retrieved Jan. 22, 2018].

European Search Report for EP Invention Patent Application No. 14 90 1789; Jan. 19, 2018; p. 1.

International Search Report for PCT Invention Patent Application No. PCT/US14/60962; Feb. 9, 2015; p. 1.

Scherbin, Anna, "Asset Price Bubbles: Selective Survey Prepared by Anna Scherbina", IMF Working Paper, Feb. 2013 (Year: 2013).

* cited by examiner

SYSTEM AND METHOD FOR MONITORING A SENTIMENT SCORE

CROSS-REFERENCE TO RELATED APPLICATIONS

This application is a continuation of U.S. patent application Ser. No. 18/094,598, filed on Jan. 9, 2023, entitled "System and Method for Monitoring a Sentiment Score," which is a continuation of U.S. patent application Ser. No. 16/874,354, filed on May 14, 2020, entitled "System and Method for Monitoring a Sentiment Score," now U.S. Pat. No. 11,551,009, which is a continuation of Ser. No. 15/615,534, filed on Jun. 6, 2017, entitled "System and Method for Monitoring a Sentiment Score," now U.S. Pat. No. 10,664,661, which is a continuation-in-part of U.S. patent application Ser. No. 14/485,626, filed on Sep. 12, 2014, entitled "Customer Management System," now U.S. Pat. No. 9,710,814. U.S. patent application Ser. No. 18/094,598, U.S. Pat. Nos. 11,551,009, 10,644,661, and 9,710,814 are assigned to the assignee of the present application. The subject matter disclosed in U.S. patent application Ser. No. 18/094,598, U.S. Pat. Nos. 11,551,009, 10,644,661, and 9,710,814 is hereby incorporated by reference into the present disclosure as if fully set forth herein.

TECHNICAL FIELD

The present disclosure relates generally to a customer management system and specifically to monitoring relationships and communication activity based on sentiments.

BACKGROUND

In most company environments, a customer experience is not an isolated conversation but a series of experiences as a relationship evolves over time. The demand of customers to utilize multiple means of communication has led to disjointed conversations between the customer and the company. The fragmentation across systems to manage these interactions has proven challenging in understanding a customer's sentiment towards a company or if they are likely to recommend a company to other potential customers.

The medium in which customers communicate with companies has grown exponentially in a short period of time. Traditionally, companies communicate with their customers verbally (in person, telephone, etc.) or in written communications (mail, email, etc.). Modem communications have added even more channels (internet chat, sms, social media, apps, etc.). This has led to disjointed exchanges adding to both the length of the conversation and the volume of the content. In many cases, multiple employees and/or different groups within a company will interact with an individual customer throughout the same conversation. This complexity has resulted in companies having no effective way to understand the emotional state (customer sentiment) of a customer in real-time or as the relationship evolves with the company through its various interactions. Therefore, previous methods of measuring customer satisfaction have proven inadequate in measuring and monitoring real-time sentiment towards a company.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

DETAILED DESCRIPTION

Figure 1:
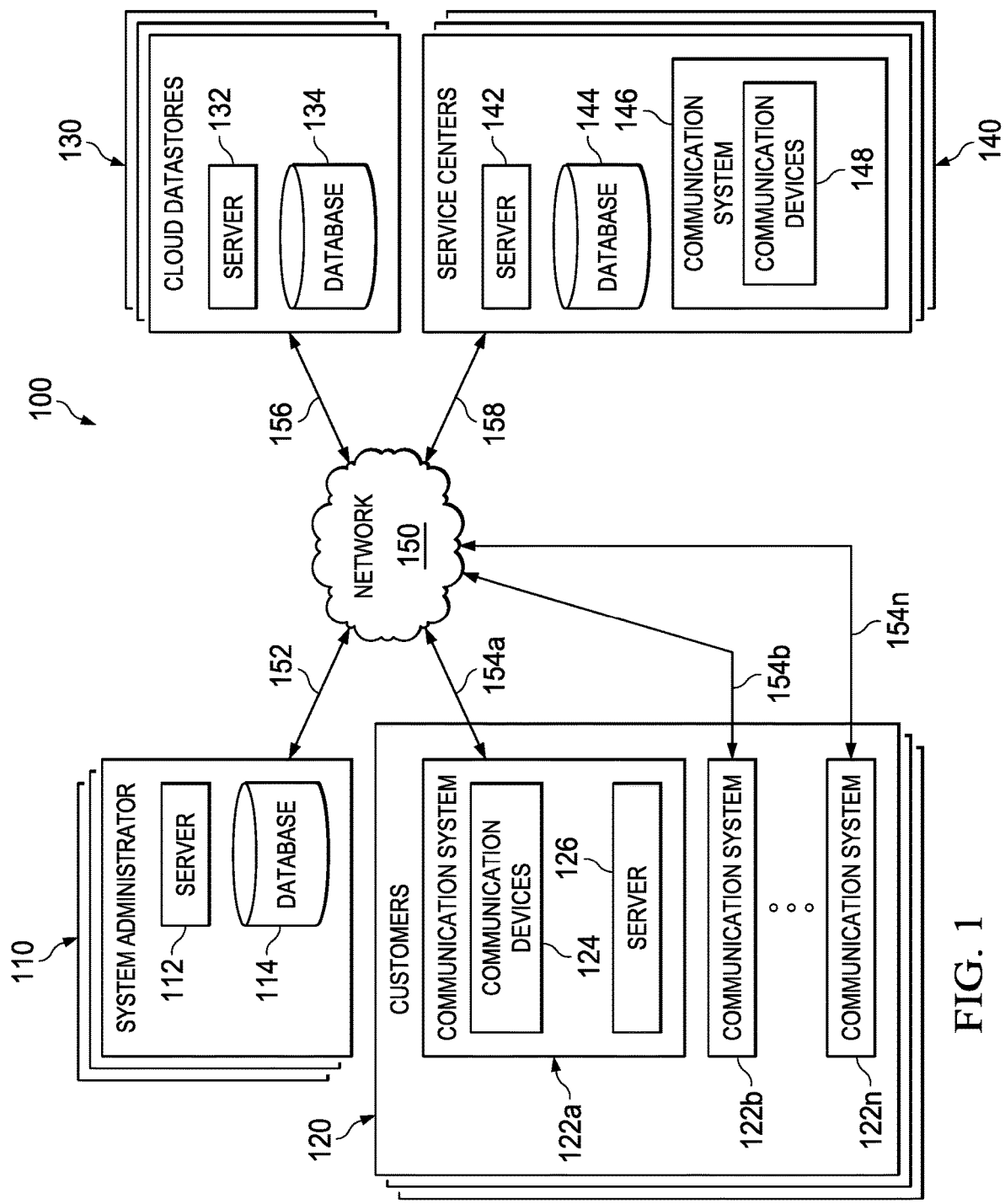
FIG. 1 illustrates a customer management system according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

As described more fully below, aspects of the following disclosure relate to monitoring relationships and communication activity between customers and representatives of a company, such as for example, a service center. In addition to monitoring relationships and communication activity, identifying the customer's emotional state of mind in real-time can be very valuable to the company. According to one aspect, embodiments provide for monitoring purposes, customer and employee performance, and reviews which can be used in real-time to increase customer satisfaction levels and build better customer relationships while addressing the customer's emotional needs. This further provides opportunities for the company to address operational inefficiencies, reduce customers churn, increase repurchase and increase the value of the customer through product and service upsell. In addition, or as an alternative, it allows a company to measure not only customer sentiment but also the employee sentiment towards an individual customer or all customers.

According to a second aspect, embodiments bring visibility to a company that it did not have before, such as, for example, measuring the feelings of customers in real-time and identifying opportunities internal to the company, such as, relating to the companies staff and/or processes. According to a third aspect, a company may simulate the communication activity between customers and the company by being aware of the customer's emotional state. That is, a company and its employees has the visibility to appropriately respond to the customer desires and concerns, based on the customer's emotional state of mind in real-time. In addition, as the customer's sentiment is captured with every interaction, the company can view the information at an interaction or conversion level and aggregate the information for the individual or any group of customers across the entire customer base. According to a third aspect, embodiments provide for a company to also benchmark themselves anonymously with other companies that participate in data sharing programs. By combining customer interactions over time, a company may understand the complete customer journey and state of mind and use this information to identify opportunities, such as, for example, to retain more customers, increase repeated purchases and create more value from the customers.

According to fourth aspect, embodiments provide for measuring the sentiment of a customer and a representative throughout the interaction of their communication activity and provides a company, such as, a service center with a real-time response, based on the customer's and/or the representative's sentiments. For example, when a customer communicates an angry email, embodiments identify the sentiment of the email communication and automate an appropriate response or another action. That is, measuring the customer's sentiment provides an ideal guide for the representative in real-time to be able to get the customer back on track or provide opportunities for a possible upsell.

According to a fifth aspect, measuring the sentiment provides a real-time indicator of the feeling, behavior, viewpoint and/or mindset of the customer and the representative based on, among other things, the communication and language used by the customer and the representative. As an example only and not by way of limitation, a subjective emotional analysis of the language used, may be scored and represented by a numerical value. In addition, or as an alternative, the subjective emotional analysis is a component of the sentiment which may be indicated by a numerical value, a color code and/or a series of phrases, such as, "Happy," "Satisfied," "Content," "Not Satisfied," and "Not Happy." Based on the sentiment score, and as discussed in more detail below, embodiments trigger automated processes, responses, suggestions for the representatives, and the like. In addition, embodiments track the communication activity to determine whether the sentiment score is escalating or deescalating.

According to a sixth aspect, the customer sentiment of each communication activity between a customer and a company may be broken down into each exchange between the customer and the employees of the company, such that the company is able to view the progress of the entire communication activity. At the same time, all information can be viewed at an aggregated level in real-time and for future reference. This allows a company to track the starting point of the interactions between a customer and a company and measure the progress of the communication activity. This provides for, among other things, data that can be viewed over time to see the customer's journey at the aggregate and detail level.

FIG. 1 illustrates an exemplary customer management system 100, according to a first embodiment. Customer management system 100 comprises one or more system administrators 110, one or more customers 120, one or more cloud datastores 130, one or more service centers 140, a network 150, and communication links 152, 154a-n, 156, and 158. Although one or more system administrators 110, one or more customers 120, one or more cloud datastores 130, one or more service centers 140, a single network 150, and communication links 152, 154a-n, 156, and 158 are shown and described, embodiments contemplate any number of system administrators, customers, service centers, cloud datastores, networks, or communication links, according to particular needs.

In one embodiment, one or more system administrators 110 comprises server 112 and database 114. Server 112 is programmed to monitor and analyze communication activity, such as, for example, telephone calls, emails, instant, chat or text messaging, posting to social media, blogs, or newsgroups, and any other communications between one or more customers 120 and one or more service centers 140. Database 114 comprises one or more databases or other data storage arrangements at one or more locations, local to, or remote from, one or more system administrators 110. In one embodiment, one or more databases 114 is coupled with one or more servers 112 using one or more local area networks (LANs), metropolitan area networks (MANs), wide area networks (WANs), network 150, such as, for example, the Internet, or any other appropriate wire line, wireless, or any other communication links. One or more databases 114 stores data that is made available and may be used by one or more servers 112 according to the operation of customer management system 100.

In one embodiment, one or more customers 120 comprises customers such as, for example, a buyer, customer, retailer, or any other individual, business or enterprise which communicates with service centers 140. One or more customers 120 comprise one or more communication systems 122a-122n that send or receive communications to and from one or more service centers 140. Communication systems 122a-122n may comprise communication devices 124 and server 126, and include any system located at one or more customers 120 that is configured to send and receive communications. Each communication device 124 may provide one or more customers 120 and one or more service centers a communication channel between the one or more customers 120 and one or more service centers 140. One or more customers 120 may be coupled with one or more service centers 140 by network 150 via communication links 154a-154n and 158. Customer management system 100 may monitor relationships of one or more customers 120 based on sentiments of interactions and communications among communication systems 122a-122n at a single customer 120, among communication systems 122a-122n located at multiple customers 120, and between multiple communication systems 122a-122n and one or more service centers 140.

In another embodiment, one or more cloud datastores 130 comprises server 132 and database 134. Cloud datastores 130 provide for the storage of data and hosting of programs or applications. According to embodiments, server 132 of cloud datastores 140 may host and run one or more runtime processes associated with system administrator 110. Server 132 comprises any server configured to access, update and provide data associated with one or more system administrators 110, one or more customers 120 or one or more service centers 140. Database 134 comprises one or more databases or other data storage arrangements at one or more locations, local to, or remote from, one or more system administrators 110. In one embodiment, one or more databases 134 is coupled with one or more servers 132 using one or more LANs, WANs, MANs, network 150, such as, for example, the Internet, or any other appropriate wire line, wireless, or any other communication links. One or more databases 134 stores data that is made available and may be used by one or more customers 120, one or more service centers 140, and one or more servers 132 according to the operation of customer management system 100.

According to embodiments, one or more service centers 140 may be any entity, such as, for example, a business, company, enterprise, distributor, retailer, call-center, CRM specialist system, customer service system, help desk system, telephone or media service, social media service (such as FACEBOOK, TWITTER, or the like) or any entity which communicates with customers 120, either its own customers 120 or the customers 120 of another entity. One or more service centers 140 may operate on one or more computers comprising one or more servers 142 and one or more databases 144 or other data storage arrangements at one or more locations which are integral to or separate from the hardware and/or software that supports customer management system 100.

In addition, or as an alternative, one or more service centers 140 may comprise one or more communication systems 146 that send or receive communications to and from one or more customers 120. Communication systems 146 may comprise communication devices 148, and include any system located at one or more service centers 140 that is configured to send and receive communications. Each communication device 148 may provide one or more service centers 140 and one or more customers 120 a communication channel between one or more customers 120 and one or more service centers 140. One or more service centers 140 may utilize customer management system 100 to monitor relationships based on sentiments of interactions and communications among communication systems 146 within a single service center 140, among multiple communication systems 146 located at one or more service centers 140, and between multiple service centers 140 and multiple customers 120. In addition, and as discussed in more detail below communications systems 146 may each operate on separate computer systems or may operate on one or more shared computer systems. Each of these one or more computer systems may be a work station, personal computer, network computer, laptop computer, notebook computer, tablet-type device, smartphone, terminal, or any other suitable communication device. In addition, communication devices 146 may comprises a land-line or VoIP telephone.

One or more system administrators 110 including server 112 and database 114 is coupled with network 150 using communications link 152, which may be any wireline, wireless, or other link suitable to support data communications between one or more system administrators 110 and network 150. One or more customers 120 is coupled with network 150 using communications links 154*a-n*, which may be any wireline, wireless, or other link suitable to support data communications between one or more customers 120 and network 150. One or more cloud datastores 130 including server 132 and database 134 is coupled with network 150 using communications link 156, which may be any wireline, wireless, or other link suitable to support data communications between one or more cloud datastores 130 and network 150. One or more service centers 140 including server 142 and database 144 is coupled with network 150 using communications link 158, which may be any wireless or other link suitable to support data communications between one or more service centers 140 and network 150.

Although communication links 152, 154*a-n*, 156, and 158 are shown as generally coupling one or more system administrators 110, one or more customers 120, one or more cloud datastores 130, and one or more service centers 140 with network 150, one or more system administrators 110, one or more customers 120, one or more cloud datastores 130, and one or more service centers 140 may communicate directly with each other according to particular needs.

In an embodiment, network 150 includes the Internet, telephone lines, any appropriate local area networks LANs, MANs, or WANs, and any other communication network coupling one or more system administrators 110, one or more customers 120, one or more cloud datastores 130, and one or more service centers 140. For example, data may be maintained by one or more system administrators 110 or one or more cloud datastores 130 at one or more locations external to one or more system administrators 110 and/or one or more cloud datastores 130 and made available to one or more system administrators 110, one or more customers 120, one or more cloud datastores 130, one or more service centers 140 using network 150 or in any other appropriate manner. Those skilled in the art will recognize that the complete structure and operation of communication network 150 and other components within customer management system 100 are not depicted or described. Embodiments may be employed in conjunction with known communications networks and other components.

In one embodiment, one or more system administrators 110, one or more customers 120, one or more cloud datastores 130, and/or one or more service centers 140 may each operate on one or more computers or computer systems that are integral to or separate from the hardware and/or software that support customer management system 100. In addition or as an alternative, one or more users or representatives, may be associated with customer management system 100 including one or more system administrators 110, one or more customers 120, one or more cloud datastores 130, and/or one or more service centers 140. These one or more users may include, for example, one or more computers programmed to autonomously handle monitoring relationships based on sentiments of one or more customers 120 and one or more service centers 140 and/or one or more related tasks within customer management system 100. As used herein, the term "computer" or "computer system" includes any suitable input device, such as a keypad, mouse, touch screen, microphone, or other device to input information. Any suitable output device that may convey information associated with the operation of customer management system 100, including digital or analog data, visual information, or audio information. Furthermore, the computer includes any suitable fixed or removable non-transitory computer-readable storage media, such as magnetic computer disks, CD-ROM, or other suitable media to receive output from and provide input to customer management system 100. The computer also includes one or more processors and associated memory to execute instructions and manipulate information according to the operation of customer management system 100.

In one embodiment and as discussed in more detail below, customer management system 100 comprises one or more system administrators 110 and/or service centers 140, which monitors and scores the sentiment of a user associated with one or more customers 120 and/or one or more service centers 140 and provides the sentiment score to service centers 140. In addition, or as an alternative, customer management system 100 stores and organizes sentiment scores based on topics related to a user interaction between customers 120 and service centers 140 over one or more communication channels such as, for example, telephone, text-based chat, email, or the like. Accordingly, customer management system 100 provides a system and method for monitoring and scoring user sentiments based on topics, channels, response times, and other sentiment criteria as described in more detail below.

By way of example only and not by limitations, embodiments contemplate a service center 140 being a customer service center (such as, for example, a call center or a retail service desk) and customers 120 being a customer of one or more service centers 140 which sold, serviced, or otherwise provides subscription services to one or more customers 120. Such subscription services may include, for example, a cloud-based email or voice-over-internet-protocol (VOIP) service. Although a particular service is described; embodiments contemplate any service or relationship between one or more customers 120 and one or more service centers 140.

Continuing with the above example, a customer associated with customers 120 may call a service center 140 and speak with a representative to inquire about a password reset of a web-based email program. When customer service center 140 receives a communication, over a communication channel, such as, for example, a telephone call, customer management system 100 identifies the communication channel as being a voice channel initiated by the telephone call, categorizes the telephone call as a password reset request, and generates a sentiment score of the interaction between the user associated with customer 120 and the representative of the service center 140.

As will be explained in more detail below, the sentiment score takes into account any interaction with the customer of customers 120 and the representative of service centers 140, service center 140 as a whole, the individual or combined cases associated with service center 140 and the overall customer base of other customers having the same overall cases. System administrators 110 determines the sentiment score based on, for example, the severity of the problem the customer is calling about, how frequent the customer has called, the tone or words used by the customer and various other factors described in more detail below. Based on these factors, system administrators 110 determines the sentiment score, based on, for example, whether the customer is "happy," "satisfied," "content," "not satisfied," "not happy" and may have a numerical range associated with it, for example, 1-10 or a color range associated with it, for example, green to red.

According to embodiments, the sentiment score provides service center 140 with an indication on whether the customer has a positive, neutral, or negative opinion of the representatives of service center 140, the service center 140 or the associated products or services of service center 140. In one embodiment, this indication is used in prioritizing responses to customers 120, generating metrics for an indication of how well customer service center 140 is operating, offering concessions to customers 120 based on the customers sentiment score, initiating campaigns to resolve frequent or disruptive problems, and the like. In addition, or as an alternative, system administrators 110 monitors which customers 120 are likely to, for example, cancel services, subscribe to more services, recommend the services to other customers, or the like.

Although, only a single customer associated with customers 120 is described above; embodiments contemplate more than one customer associated with customers 120. For example, if customers 120 represents an organization or entity, there may be more than one individual associated with the organization or entity that contacts service centers 140. Likewise, although only a single point of contact, i.e., a representative is described as being associated with one or more service centers 140; embodiments contemplate more than one point of contact, i.e., multiple representatives at one or more service centers 140. For example, and as discussed above, if service centers 140 provides subscription services to customers 120, customers 120 may speak with different representatives of service centers 140 to inquire about various subscription services, various issues and at various times.

Figure 2:
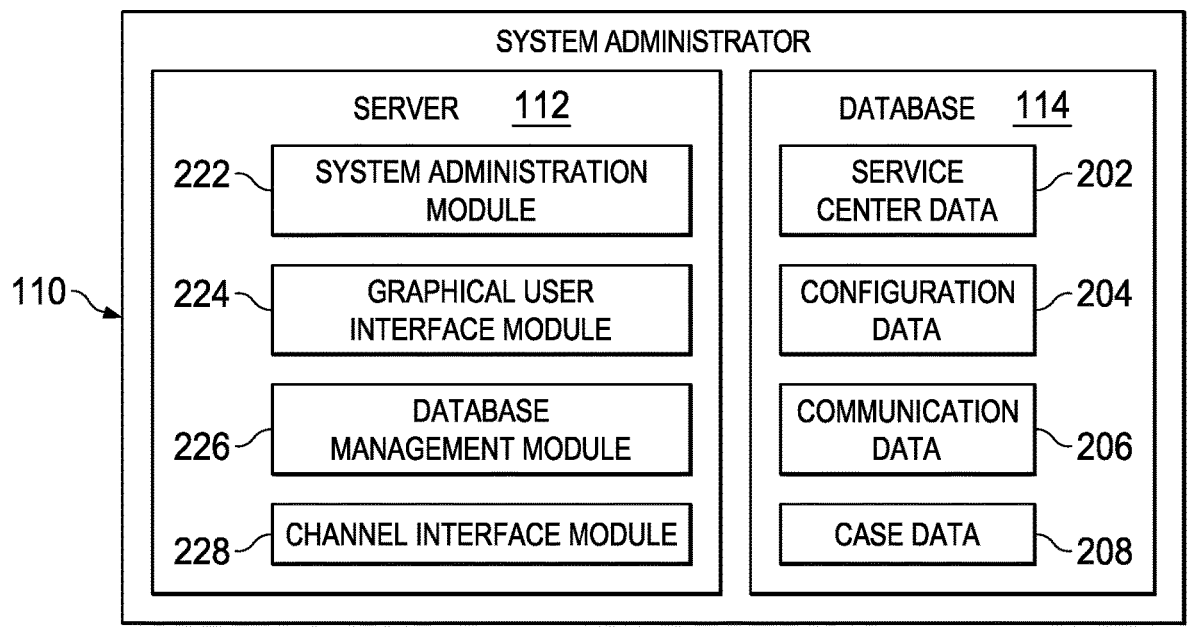
FIG. 2 illustrates the system administrator of FIG. 1 according to an embodiment.

FIG. 2 illustrates system administrator 110 of FIG. 1 in greater detail, according to an embodiment. As discussed above, system administrator 110 comprises one or more computers at one or more locations including associated input devices, output devices, non-transitory computer-readable storage media, processors, memory, or other components for capturing the sentiment of one or more customers 120 and one or more service centers 140 according to the operation of customer management system 100. In addition, and as discussed in more detail below, system administrator 110 comprises server 112 and database 114. Although system administrator 110 is shown and described as comprising a single computer, server 112 and database 114; embodiments contemplate any suitable number of computers, servers or databases internal to or externally coupled with system administrator 110. In addition, or as an alternative, system administrator 110 may be located internal to one or more service centers 140. In other embodiments, system administrator 110 may be located external to one or more service centers 140 and may be located in, for example, a corporate or regional entity of the one or more service centers 140, according to particular needs.

Server 112 comprises system administration module 222, graphical user interface module 224, database management module 226 and channel interface module 228. Although a particular configuration of server 112 is shown and described; embodiments contemplate any suitable number or combination of these, located at one or more locations, local to, or remote from, system administrator 110, according to particular needs. In addition, or as an alternative, administration 222, graphical user interface module 224, database management module 226 and channel interface module 228 may be located on multiple servers or computers at any location in customer management system 100.

Database 114 comprises service center data 202, configuration data 204, communication data 206 and case data 208. Although, database 114 is shown and described as comprising service center data 202, configuration data 204, communication data 206 and case data 208; embodiments contemplate any suitable number or combination of these, located at one or more locations, local to, or remote from, system administrator 110, according to particular needs.

Service center data 202 of database 114 describes the identification information of one or more service centers 140 of customer management system 100. Service center data 202 comprises identification information, such as, for example, names, addresses, company, telephone numbers, email, IP addresses, and the like. In one embodiment, service center data 202 is used by system administration module 222 to identify one or more service centers 140 in customer management system 100 to generate particular configurations of customer management system 100 specific to each of the one or more service centers 140. As an example only and not by way of limitation, where one or more service centers 140 is a customer service center, the identification information stored in service center data 202 permits system administrator 110 to generate a particularized user interface specific to the customer service center. Specifically, system administration module 222 provides a particularized user interface specific to the industry of service center 140, the types of customers served by one or more service centers 140, and/or the types of products sold by one or more service centers 140. In addition, or as an alternative, the particularized user interfaces are stored in, for example, configuration data 204.

Configuration data 204 of database 114 comprises data which describes the various functionalities of customer management system 100 useful to each of one or more service centers 140 and one or more customers 120. In one embodiment, configuration data 204 comprises, for example, location data that describes where the data is generated or received by system administrator 110, customers 120, cloud datastores 130 and/or service centers 140. In another embodiment, configuration data 204 comprises settings and parameters that describe the system-level functioning of customer management system 100. In addition, or as an alternative, configuration data 204 comprises data representing topics, channels, response times, and other sentiment criteria related to the interaction between users of customers 120 and representatives of service centers 140 and the type of communication channel.

Communication data 206 of database 114 comprises the communication activity of communication devices 124 and any organization and setup of channel interface module 228. According to some embodiments, communication data 206 comprises the particular communication channels which are open to a particular customer 120 or service centers 140, the times which the communication channels are open, the protocols or metadata which describe the communication, and/or any other configuration data and setup data necessary to configure channel interface module 228.

Case data 208 of database 114 comprises data generated by one or more service centers 140 relating to a case or a ticket associated with one or more customers 120. In one embodiment, case data 208 includes, but is not limited to: an identity of the user of one or more customers 120 which created the case or ticket, communication system 122a-122n or a company of the one or more customers 120 to which the case or ticket relates, the communication channel by which one or more customers 120 contacted the one or more service centers 140, the number of contacts between one or more customers 120 and one or more service centers 140 (historically or for a given time period), the total time spent on each communication channel, the cost associated with each communication activity, the time and date of the case or ticket creation, and a log of the information shared during the communication activity between one or more customers 120 and one or more service centers 140. In addition, or as an alternative, case data 208 additionally comprises purchases, sales, subscriptions, purchase history, sales history, and/or other historical data describing the relationship of the one or more customers 120 to one or more service centers 140 or any other goods or services provided. In this way, case data 208 provides customer management system 100 with information about the history of the customer base that each of customers 120 represents or that each of the representatives of service centers 140 represents for any given time period.

System administration module 222 of server 112 may configure, update, and/or administer customer management system 100. That is, system administration module 222 may provide services to configure the operation of customer management system 100 and change which data is executed and/or stored on system administrator 110, one or more customers 120, and/or one or more service centers 140. Embodiments contemplate a user-configurable customer management system 100, such that the data may be stored either singularly or redundantly on system administrator 110, one or more customers 120, and/or one or more service centers 140, according to particular needs. In addition, or as an alternative, system administration module 222 receives, processes, updates, creates, and stores service center data 202 and configuration data 204.

Graphical user interface module 224 of server 112 generates a graphical user interface comprising various features of sentiment scores, such as, for example: generating charts, storing and retrieving historical data of customer relationship management, and displaying notifications. Graphical user interface module 224 stores and retrieves data from database 114 including service center data 202, configuration data 204, communication data 206, and case data 208. According to embodiments, and as discussed in more detail below, graphical user interface module 224 displays a representation of a sentiment score to the representative of one or more service centers 140 represented by a numerical value, color code, and/or a series of phrases. In addition, or as an alternative, the representation of the sentiment score may be displayed each time a user of one or more customers 120 initiates communication activity, each time the representative responds and/or for the entire communication activity.

Database management module 226 of server 112 provides a data sorting, retrieval, duplication, backup, creation and/or interface manager for data stored in database 114 to efficiently provide data to one or more customers 120 and one or more service centers 140 and manage the data generated from various components of customer management system 100 that are stored in database 114. According to some embodiments, database management module 226 organizes and stores the various types of data generated from customer management system 100 to provide real-time access of the data on database 114 to operate customer management system 100.

Channel interface module 228 of server 112 generates, receives, and monitors communication activity between one or more customers 120 and one or more service centers 140. For example, channel interface module 228 comprises one or more of VOIP, email, internet or web-based chat, and/or other types of communication systems useful for allowing customers 120 to contact one or more service centers 140 or one or more service centers 140 to contact one or more customers 120 or other service centers 140. For example, channel interface module 228 initiates or receives communication to communication devices 124 of one or more communication systems 122a-122n. In addition, channel interface module 228 records the time, duration, date, voice, text, and other information transmitted.

In addition, and as discussed in more detail below, system administrator 110 monitors the communication activity between customers 120 and service centers 140 and stores the monitored communication activity as communication data 206 in database 114. Communication data 206 may be collected by system administrator 110 and may comprise, for example, the time of a communication, the person that initiated the communication, the communication channel used for the communication, and other data associated with the communication activity. By collecting communication data 206, system administrator 110 improves and automates monitoring relationships and communication activity based on sentiments. According to embodiments, system administrator 110 automates tasks such as determining and monitoring a sentiment score based on an interaction between a customer and one or more service centers 140. Embodiments of system administrator 110 may be tailored to call center environments, professional office organizations, or any other type of business environments, in which, a customer is communicating with one or more service centers 140.

In one embodiment, system administrator 110 comprises a centralized computer system which operates the system-level architecture of customer management system 100. In this manner, system administrator 110 through one or more modules provides customer management system 100 the ability to rapidly update and/or reconfigure communication activity between one or more customers 120 and one or more service centers 140 from a single or central location.

Figure 3:
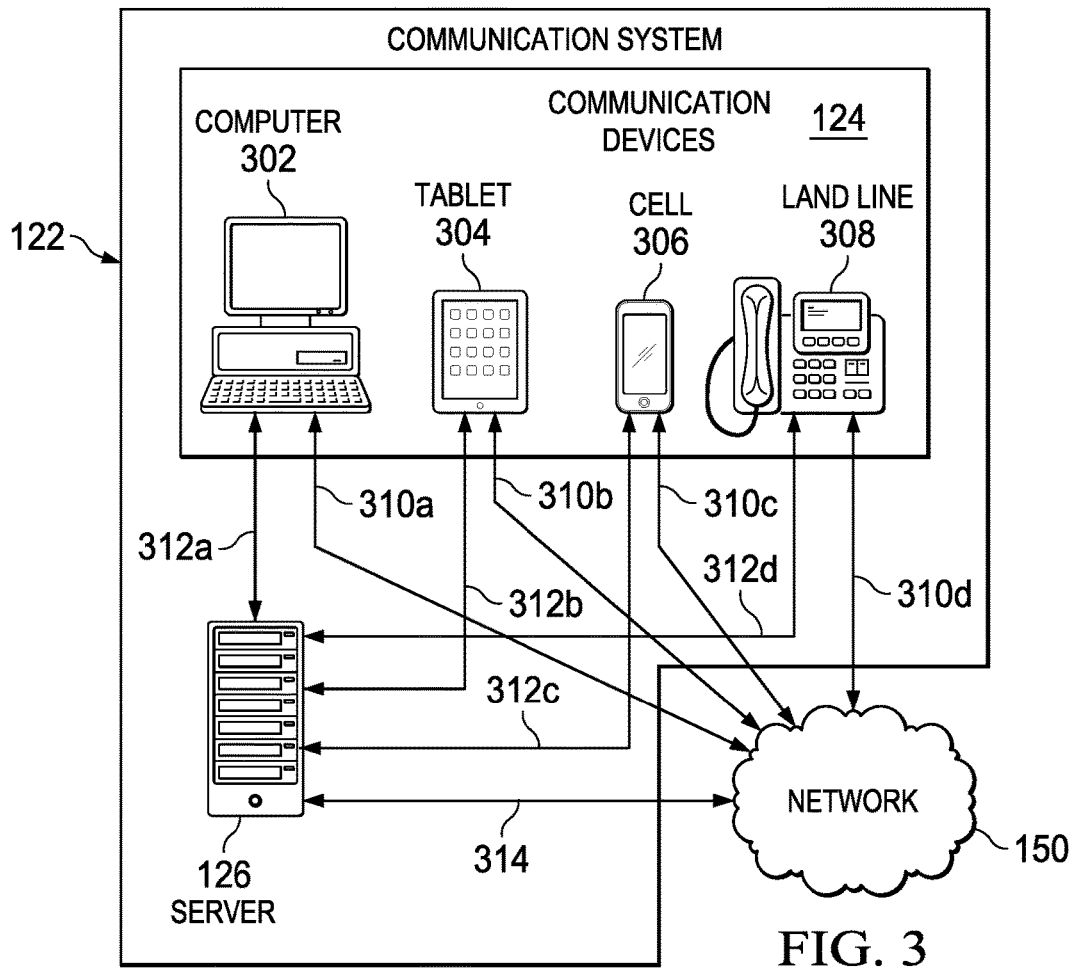
FIG. 3 illustrates the communication system of FIG. 1 according to an embodiment.

FIG. 3 illustrates communication systems 122a-122n of FIG. 1 in greater detail according to an embodiment. Communication systems 122a-122n may comprise communication devices 124, server 126, and/or communication channels 310-314 which may be configured to communicate with network 150, system administrator 110, one or more cloud datastores 130, and communication devices 148 of one or more service centers 140. In one embodiment, one or more communication systems 122a-122n may each operate on separate computer systems or may operate on one or more shared computer systems. Each of these one or more computer systems may be a computer system 302, such as a work station, personal computer, network computer, laptop computer, notebook computer, tablet-type device 304, smart-phone 306, terminal, or any other suitable communication device 124. In addition, communication devices 124 may comprise a land-line or VoIP telephone 308. According to embodiments each of the communication devices 124 are configured to communicate with communication devices 148 over a communication channel.

Computer system 302, one or more tablet-type devices 304, smartphones 306, and land-line or VoIP telephone 308 may comprise a processor, memory and data storage. The processor may execute an operating system program stored in memory to control the overall operation of computer system 302, one or more tablet-type devices 304 and/or smartphones 306. For example, the processor may control the reception of signals and the transmission of signals within customer management system 100. The processor may execute other processes and programs resident in memory, such as, for example, registration, identification or communication over the communication channels and move data into or out of the memory, as required by an executing process.

Those skilled in the art will recognize that one or more specific examples of communication systems 122a-122n are given by way of example and that for simplicity and clarity, only so much of the construction and operation of one or more communication systems 122a-122n as is necessary for an understanding of the present invention is shown and described. Moreover, it is understood that one or more communication systems 122a-122n should not be construed to limit the types of devices in which embodiments of the present invention may be implemented. For example, one or more communication systems 122a-122n may be any device, including, but not limited to, conventional cellular or mobile telephones, smart mobile phones, an IPHONE™, an IPAD™, wireless tablet devices, paging devices, personal digital assistant devices, short message service (SMS) wireless devices, portable computers, or any other device capable of wireless or network communication.

According to embodiments, each of the one or more communication devices 124 and 148 (see FIG. 1) may be assigned one or more identification numbers, such as IP addresses, serial numbers, or telephone numbers that may be used to identify communication devices 124 and 148. According to some embodiments, each communication device 124 and 148 is associated with an identification number, such as an IP or MAC address. In addition, or as an alternative, communication systems 122a-122n may be local to or remote from one or more customers 120 and one or more service centers 140. That is, communication devices 124 of one or more customers 120 may communicate with communication devices 146 of one or more service centers 140. For example, system administrator 110 is programmed to monitor and analyze communication activity via communication channels, such as, for example, telephone calls, emails, instant, chat or text messaging, posting to social media, blogs, or newsgroups, and any other communication activity between communication devices 124 of one or more customers 120 and communication devices 148 of one or more service centers 140.

Customer management system 100 may then leverage the identity of communication devices 124 and 148 and communication activity over a communication channel for each communication device 124 and 148 to collect information about, for example, a telephone call or other communication activity between one or more customers 120 and one or more service centers 140, as described herein. Such information may then be used to determine a sentiment score as an indicator of behavior, viewpoint and/or mindset of the communication activity between the two users or entities. For example and as discussed above, according to some embodiments, customer management system 100 monitors communication activities between communication devices 124 of one or more customers 120 and communication devices 148 of one or more service centers 140, such as the telephone call using land line 308.

In this example, when a telephone call is received, customer management system 100 may identify the caller and the representative (based on a telephone number stored in service center data 202) as a customer having a subscription services and route the call directly to a representative assigned to the customer. Customer management system 100 may then record the telephone call and generate a sentiment score of the communication activity based on each time the customer talks, each time the representative responds and/or based on the entire telephone call. For example, and as discussed in more detail below, a sentiment score may be generated during the communication activity, in this case, the telephone call, for both the customer and the representative assigned to the customer. In this way, customer management system 100 tracks the sentiment of the customer and the representative in a real-time manner and provides the sentiment of the customer to the representative during the telephone call. The representative, may then respond to the customer based on the ongoing sentiment score appropriately and/or trigger automated processes, responses or suggestions for the representative. Likewise, the communication activity is tracked by customer management system 100 to determine whether the sentiment of the communication activity is escalating or deescalating.

Figure 4:
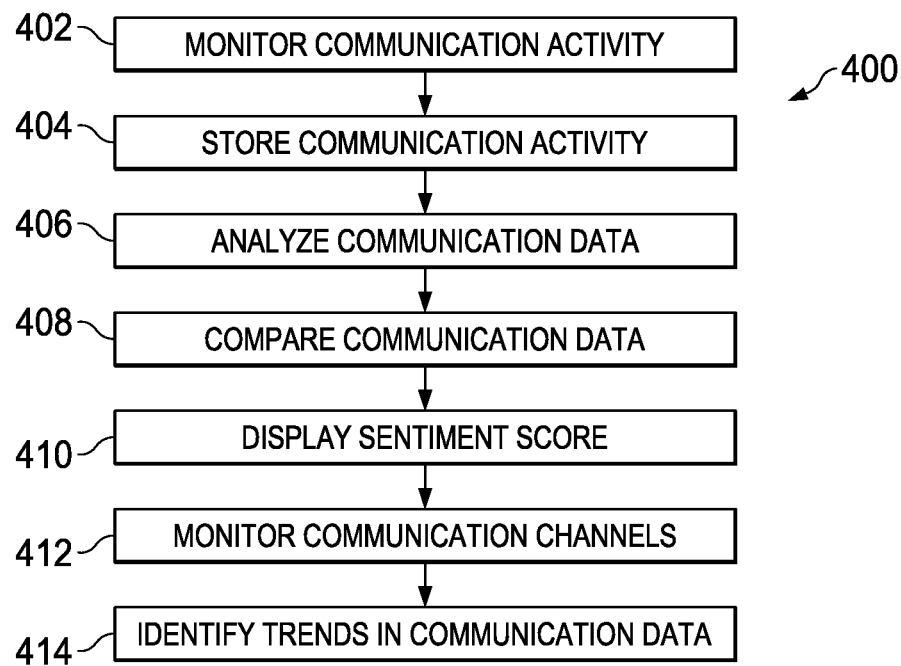
FIG. 4 illustrates an exemplary method of monitoring and scoring the sentiment of a customer and a representative of a service center.

FIG. 4 illustrates an exemplary method 400 of monitoring and scoring the sentiment of one or more customers 120 and/or one or more service centers 140. The process of monitoring and scoring proceeds by one or more activities, which although described in a particular order may be performed in one or more permutations, according to particular needs.

Method 400 begins at activity 402 where system administrator 110 monitors one or more communication devices 124 and 148 and records communication activity via a communication channel between one or more customers 120 and one or more service centers 140. According to embodiments and as discussed above, channel interface module 228 of system administrator 110 monitors communication activity to determine whether a communication channel has been opened between one or more customers 120 and one or more service centers 140. For example, when a communication channel is opened, system administrator 110 monitors the communication activity for: the time of the communication; who placed the communication; who received the communication; the communication duration; the contents of the communication; and/or other like communication activity information.

In addition, or as an alternative, each communication activity is associated with one or more cases or tickets of one or more service centers 140, and logged in connection with case data 208. As discussed above, case data 208 comprises data relating to a case or a ticket associated with one or more customers 120 and may include, for example, data describing the relationship of one or more customers 120 to one or more service centers 140. In addition, system administrator 110 may work in connection with other systems and devices to automatically detect and monitor when a communication activity is initiated on a communication device 124 and/or 148 and log the communication activity in communication data 206 of system administrator 110.

At activity 404, system administrator 110 records and stores communication activity as communication data 206 in database 114. As discussed above, recording and storing the communication activity may be done each time one or more customers 120 communicates with a representative of one or more service centers 140, each time the representative of one or more service centers 140 communicates with one or more customers 120 and/or based on the entire communication activity between one or more customers 120 and a representative of one or more service centers 140. Such storage may require large amounts of on-site or off-site data storage solutions owing to the enormous amount of data that may be collected for even a small business. Embodiments contemplate any suitable number or structure of local or remote data storage solutions to store communication data 206, such as for example, database 134 of cloud datastore 130. Like communication data 206, configuration data 204 may require large amounts of on-site or off-site data storage solutions and may be stored on database 134 of cloud datastore 130.

At activity 406, system administrator 110 analyzes communication data 206 to determine a sentiment score of users associated with customers 120 and/or representatives associated with service centers 140 and provides the sentiment score to service centers 140. In one embodiment, a sentiment of the language used in the communication activity between one or more customers 120 and a representative of one or more service centers 140, is scored based on a continuous sequence of n items for a given sequence of the communication activity. As an example only and not by way of limitation, a user associated with customers 120 opens a communication channel using, for example, chat as a communication activity with one or more service centers 140 and is assigned a particular representative. In this example, the user types into the chat window "I am getting choppy audio on my VOIP phone." Based on this, system administrator 110 breaks the sequence of words into a trigram i.e., three adjacent elements from the sequence of words and compares the three adjacent elements to determine if any of those elements are negative or positive. Continuing with this example, the sequence of words is shown in TABLE 1:

TABLE 1

I am getting
am getting choppy
getting choppy audio
choppy audio on
audio on my
on my VOIP
my VOIP phone System administrator 110 then determines whether each of the three adjacent elements from the sequence is positive, neutral or negative, based on a comparison of predetermined key words, as discussed in more detail below. Continuing with this example, the adjacent words "getting choppy audio" are determined to be negative and a negative score is associated with the sequence of words. Although a particular number for n items is shown and described as a trigram i.e., three elements, embodiments contemplate any number of n items or adjacent elements, according to particular needs.

According to another embodiment, a sentiment of the language used in the communication activity between one or more customers 120 and a representative of one or more service centers 140, is scored based on a mapping of word vectors. As an example only and not by way of limitation, predetermined words are given negative or positive weighting and then related words in context are deemed positive, neutral or negative based on their proximity to the predetermined words in word vectors. Proximity is based on syntactic and/or semantic similarity, depending on the model in use. Continuing with the above example, if a given negative word was "intermittent", and the system administrator 110 finds that "choppy" is in close proximity in the vector model, the score for "intermittent" would be used, scaled to its proximity.

According to other embodiments, a sentiment of the language used in the communication activity between one or more customers 120 and a representative of one or more service centers 140, is scored based on a predetermined message rating of communication activity. As an example only and not by way of limitation, predetermined ratings may be determined for each service centers 140. Continuing with the above example, system administrator 110 compares the "I am getting choppy audio on my VOIP phone" communication activity from the user associated with customers 120 to determine if that message is associated with any of the predetermined messages and, if so, a score is associated with the communication activity, based on a predetermined message rating.

In addition, and as discussed above, customer management system 100 stores and organizes sentiment scores based on topics related to the interaction between users of customers 120 and representatives of service centers 140 over one or more communication channels. For example, system administrator 110 may receive communication data 206, such as a log file or otherwise recorded conversations of the communication activity between one or more customers 120 and one or more service centers 140 and transcribe, sort, and/or organize communication data 206 based on a communication metric, factor, time aggregation or granularity, communication channel type (voice, video, email, text, chat or the like), communication type (telephone, fax, text message, instant messaging, or the like), entity identification information, user identification information, telephone number, representatives, location, or other like factors.

At activity 408, system administrator 110 compares configuration data 204, communication data 206 and case data

208. System administrator 110 may compare communication data 206 by various user-selected or automatic comparisons. For example, and as discussed above, system administrator 110 may compare the log files, recorded or transcribed conversations of the communication activity with a continuous sequence of n items of configuration data 204 to determine if any of the adjacent elements from the sequence of n items are present in the communication activity. As another example and as discussed above, system administrator 110 may compare the log files, recorded or transcribed conversations of the communication activity with a mapping of word vectors of configuration data 204 to determine if any of those elements are present in the communication activity.

In addition, or as an alternative, system administrator 110 may permit service centers 140 to select customizations or may automatically identify user-specified predetermined key words or message ratings of communication data 206, and identify the predetermined key words or messages from the communication data 206. If any of the adjacent elements from the sequence of n items, elements of the word vectors or predetermined key words or messages are present, system administrator 110 determines a sentiment score and triggers one or more current or predictive actions. An advanced user may also rate their own communication data 206 as, for example, 'very positive', 'positive', 'negative' or 'very negative' and, given enough ratings, a predictive model of future communications will be custom built for that specific customer. For example, for a particular case identified by case data 208, system administrator 110 may determine a sentiment score for the user sentiment (i.e., 0.62), a contact associated with the sentiment (i.e., identity of the user of one or more customers 120), a company's base sentiment (i.e., "satisfied") and/or the representative's sentiment (i.e., 0.77). Based on the sentiment, system administrator 110 may trigger a predetermined process for the representative to deescalate the sentiment of the user of one or more customers 120, to a satisfactory level.

At activity 410, system administrator 110 displays a sentiment score of communication data 206 according to one or more charts, graphs, score cards, spreadsheets, alerts and/or reports. Such charts, graphs, score cards, spreadsheets, alerts and/or reports may be scheduled to be run according to user-selected criteria, such as customizations or correlations, at any suitable time period or upon a specified system administrator 110 action. According to embodiments, a sentiment may be represented by a numerical value, such as −1 to 1, 1-10, 1-100 or the like, a color code, such as green is very positive, red is very negative or the like, or a series of phrases, such as, "Happy," "Satisfied," "Content," "Not Satisfied," and "Not Happy." Although particular examples of representations of the sentiment score are described as particular ranges of numbers, colors and/or phrases, embodiments contemplate any ranges of numbers, colors or phrases, according to particular needs.

In addition, or as an alternative, and based on the sentiment score associated with the communication activity, system administrator 110 triggers the representation of the sentiment on one or more communication devices 148 of one or more service centers 140. For example and continuing with the above example, in which a user associated with customers 120 opens a communication channel and types into the chat window "I am getting choppy audio on my VOIP phone," system administrator 110 represents the sentiment of the user by a numerical value, a color code and/or a series of phrases. In one embodiment, and based on the adjacent words "choppy audio," system administrator 110 displays a numerical value of, for example, a score of 1 out of a score of 1-10 on one or more communication devices 148 of the representative of the one or more service centers 140.

In other embodiments, and based on the adjacent words "choppy audio," system administrator 110 displays a color code of, for example, red on one or more communication devices 148 of the representative of the one or more service centers 140. In addition, or as an alternative, system administrator 110 may use red font to color code the words "choppy audio" on one or more communication devices 148 of the representative of the one or more service centers 140. According to yet other embodiments, and based on the adjacent words "choppy audio," system administrator 110 displays a phrase, for example, "Not Satisfied," on one or more communication devices 148 of the representative of the one or more service centers 140. Based on the sentiment score, and as discussed below, embodiments trigger automated processes, responses, suggestions for the representatives, and the like.

In addition, embodiments track the communication activity to determine whether the sentiment score is escalating or deescalating. According to embodiments, system administrator 110 may use a time-based evaporation period to track the psychological mean reversion of the sentiment score. For example, if a customer communication activity escalates a sentiment score, over time the sentiment score will deescalate based on a uniform evaporation of the escalated score, until it reaches the pre-escalated mean. According to other embodiments, system administrator 110 may permit service centers 140 to customize the sentiment score over time based on the interaction between users of customers 120 and representatives of service centers 140 including case data 208. For example, and as discussed above, each communication activity is associated with one or more cases or tickets of one or more service centers 140, and logged in connection with case data 208. System administrator 110 allows service centers 140 to determine the sentiment score based on the average of all of the cases or tickets of case data 208, a first case or ticket of case data 208, the last case or ticket of case data 208, or a particular case or ticket or some combination of case or ticket of case date 208, according to particular needs. In addition, or as an alternative, system administrator 110 updates the display of the numerical value, the color code and/or the series of phrases throughout the communication activity and provides a real-time, averaged, or other updated representation of the sentiment score to one or more service centers 140.

According to other embodiments, system administrator 110 may block a representative associated with one or more service centers 140 from communicating via the communication channel to a user of one or more customers 120, if the sentiment score is below a predetermined threshold. For example, and continuing with the above example, if the sentiment of the user associated with customers 120 who typed into the chat window "I am getting choppy audio on my VOIP phone," began escalating and the representative typed a chat message that would move the sentiment score above a predetermined threshold. System administrator 110 would cause the chat message from the representative to not be communicated to the user associated with customers 120. In addition, or as an alternative, system administrator 110 may automatically reword the chat message, provide a message to the representative to correct the chat message and/or escalate the chat message to a manager. According to embodiments, system administrator 110 would trigger automated processes, responses, suggestions for the representative or transfer the communication activity to another representative or manager. In addition, such charts, graphs, score cards, spreadsheets, alerts, reports, and/or blocking may be customized by a user, customer, representative, or service center 140, according to particular needs.

Figure 5:
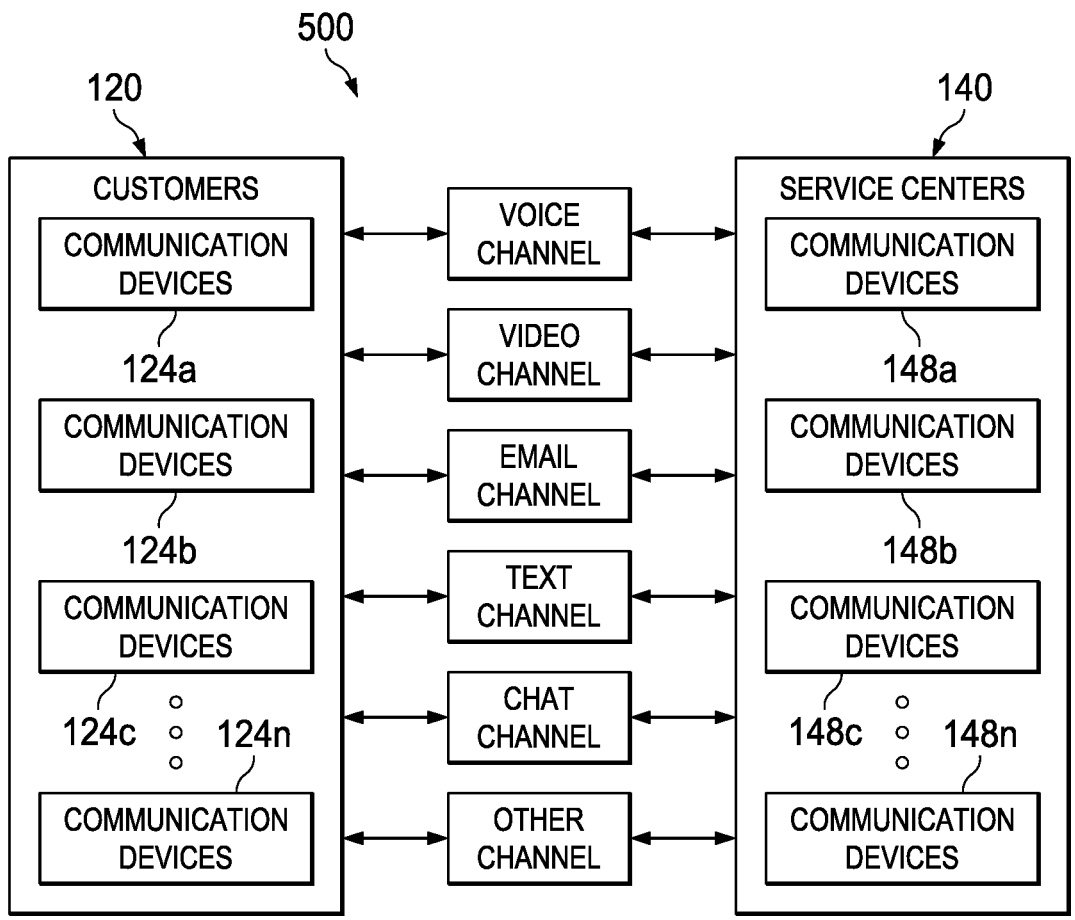
FIG. 5 illustrates the communication channels of FIG. 1 in greater detail according to an embodiment.

FIG. 5 illustrates the communication channels of FIG. 1 in greater detail according to an embodiment. As discussed above, each of the communication devices 124a-124n of the one or more customers 120 may communicate with each of the communication devices 148a-148n of the one or more service centers 140 via communication channels. As discussed above, if service centers 140 provides subscription services to customers 120, one or more users associated with customers 120 may communicate with one or more representatives associated with service centers 140 over various communication channels. As an example only and not by way of limitation, a user of communication device 124a may use cell phone 306 or land line 308 to communicate with a representative of communication device 148a using a voice communication channel to inquire about various subscription service issues. On another occasion, the same user of communication device 124a may use another communication device 124 or the same communication device 124 to communicate with a different representative 148b using another communication channel to inquire about other subscription service issues. Although, particular communication devices and associated communication channels are shown and described; embodiments contemplate any number of users associated with communication devices 124, any number of representatives associated with communication devices 148 and any communication channel, according to particular needs.

At activity 412, system administrator 110 may monitor the communication channels to determine whether there is a change in the communication metric, factor, time aggregation or granularity, communication channel type, communication type, entity identification information, user identification information, telephone number, representatives, or location on a case by case basis. System administrator 110 may automatically choose which communication metrics are analyzed according to comparisons identified by system administrator 110 at activity 408.

At activity 414, system administrator 110 may identify trends within the communication channels by monitoring changes in communication data 206 according to customizations or correlations selected in activity 412. For example, if system administrator 110 identifies that an representative's sentiment score is lower than average, it may monitor that representative's future sentiment score to determine whether the representative's sentiment scores are increasing or decreasing with respect to a particular, customer or topic. As another example, if system administrator 110 identifies that a customer's sentiment score is lower than the rest of the customer base, it may monitor that customer's future sentiment score to determine whether the customer's sentiment scores are increasing or decreasing with respect to a particular representative or topic. In this way, communication system 110 may generate alerts or reports with regard to the performance of users associated with customers 120 and/or representatives associated with service centers 140.

According to embodiments, system administrator 110 may permit one or more service centers 140 to compare communication data 206 with configuration data 204 and case data 208, and analyze the comparison over a specified time period, such as, for example, per year, quarter, month, and compare information by users of one or more customers 120 and representatives of one or more service centers 140, in an intuitive way. Furthermore, embodiments contemplate permitting one or more service centers 140 to schedule alerts or reports and generate sentiment scores that are configured to assist a representative to predict whether a customer is more likely to respond in a certain way, based on the overall customer sentiment and the historical data. According to other embodiments, system administrator 110 provides a next issue resolution such that, system administrator 110 provides a real-time feedback to the representative of service centers 140 based on the determined sentiment score as an indicator of behavior of the communication activity.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for administrating one or more service centers of a customer management system, comprising:
   one or more databases storing data associated with the one or more service centers; and
   a computer, comprising a processor and memory, configured to:
      identify the one or more service centers of the customer management system;
      generate one or more particular configurations of the customer management system specific to the one or more service centers;
      generate a particularized user interface specific to each of the one or more service centers;
      monitor one or more relationships and one or more communication activities between one or more customers and the one or more service centers to identify one or more sentiment scores, wherein the one or more sentiment scores are identified based on one or more trigrams;
      trigger an automated response based, at least in part, on at least one of the one or more sentiment scores;
      store one or more of: service center data, configuration data, communication data and case data in the one or more databases; and
      configure and update one or more operations of the customer management system.

2. The system of claim 1, wherein the particularized user interface is specific to an industry of the one or more service centers, one or more types of customers of the one or more service centers or one or more types of products sold by the one or more service centers.

3. The system of claim 1, wherein the particularized user interface comprises various features of one or more sentiment scores of the one or more customers.

4. The system of claim 1, wherein the configuration data comprises one or more settings and one or more parameters describing one or more system-level functions of the customer management system.

5. The system of claim 1, wherein the communication data comprises one or more protocols and metadata describing a configuration and a setup for configuring one or more communication channels.

6. The system of claim 1, wherein the computer is further configured to:
- store one or more of: the service center data, the configuration data, the communication data and the case data either singularly or redundantly in the one or more databases.

7. The system of claim 1, wherein the computer is further configured to:
- determine and monitor one or more sentiment scores based on the one or more communication activities between the one or more customers and the one or more service centers.

8. A computer-implemented method for administrating one or more service centers of a customer management system, comprising:
- storing, in one or more databases by a computer comprising a processor and memory, data associated with the one or more service centers;
- identifying, by the computer, the one or more service centers of the customer management system;
- generating, by the computer, one or more particular configurations of the customer management system specific to the one or more service centers;
- generating, by the computer, a particularized user interface specific to each of the one or more service centers;
- monitoring, by the computer, one or more relationships and one or more communication activities between one or more customers and the one or more service centers to identify one or more sentiment scores, wherein the one or more sentiment scores are identified based on one or more trigrams;
- triggering, by the computer, an automated response based, at least in part, on at least one of the one or more sentiment scores;
- storing, by the computer, one or more of: service center data, configuration data, communication data and case data in the one or more databases; and
- configuring and updating, by the computer, one or more operations of the customer management system.

9. The computer-implemented method of claim 8, wherein the particularized user interface is specific to an industry of the one or more service centers, one or more types of customers of the one or more service centers or one or more types of products sold by the one or more service centers.

10. The computer-implemented method of claim 8, wherein the particularized user interface comprises various features of one or more sentiment scores of the one or more customers.

11. The computer-implemented method of claim 8, wherein the configuration data comprises one or more settings and one or more parameters describing one or more system-level functions of the customer management system.

12. The computer-implemented method of claim 8, wherein the communication data comprises one or more protocols and metadata describing a configuration and a setup for configuring one or more communication channels.

13. The computer-implemented method of claim 8, further comprising:
- storing, by the computer, one or more of: the service center data, the configuration data, the communication data and the case data either singularly or redundantly in the one or more databases.

14. The computer-implemented method of claim 8, further comprising:
- determining and monitoring, by the computer, one or more sentiment scores based on the one or more communication activities between the one or more customers and the one or more service centers.

15. A non-transitory computer-readable medium comprising software for administrating one or more service centers of a customer management system, the software when executed:
- identifies the one or more service centers of the customer management system;
- generates one or more particular configurations of the customer management system specific to the one or more service centers;
- generates a particularized user interface specific to each of the one or more service centers;
- monitors one or more relationships and one or more communication activities between one or more customers and the one or more service centers to identify one or more sentiment scores, wherein the one or more sentiment scores are identified based on one or more trigrams;
- triggers an automated response based, at least in part, on at least one of the one or more sentiment scores;
- stores one or more of: service center data, configuration data, communication data and case data in the one or more databases; and
- configures and updates one or more operations of the customer management system.

16. The non-transitory computer-readable medium of claim 15, wherein the particularized user interface is specific to an industry of the one or more service centers, one or more types of customers of the one or more service centers or one or more types of products sold by the one or more service centers.

17. The non-transitory computer-readable medium of claim 15, wherein the particularized user interface comprises various features of one or more sentiment scores of the one or more customers.

18. The non-transitory computer-readable medium of claim 15, wherein the configuration data comprises one or more settings and one or more parameters describing one or more system-level functions of the customer management system.

19. The non-transitory computer-readable medium of claim 15, wherein the communication data comprises one or more protocols and metadata describing a configuration and a setup for configuring one or more communication channels.

20. The non-transitory computer-readable medium of claim 15, wherein the software when executed further:
- stores one or more of: the service center data, the configuration data, the communication data and the case data either singularly or redundantly in the one or more databases.

* * * * *